(12) United States Patent
Shimanaka (10) Patent No.: US 9,126,549 B2
(45) Date of Patent: Sep. 8, 2015

(54) SOUND INSULATION STRUCTURE FOR VEHICLE

(75) Inventor: Tsuneki Shimanaka, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 31 days.

(21) Appl. No.: 14/236,598

(22) PCT Filed: Jul. 10, 2012

(86) PCT No.: PCT/JP2012/004438
§ 371 (c)(1),
(2), (4) Date: Jan. 31, 2014

(87) PCT Pub. No.: WO2013/018284
PCT Pub. Date: Feb. 7, 2013

(65) Prior Publication Data
US 2014/0175825 A1    Jun. 26, 2014

(30) Foreign Application Priority Data

Aug. 1, 2011  (JP) ................................. 2011-168465

(51) Int. Cl.
*B60R 13/08* (2006.01)
*B62D 25/16* (2006.01)

(52) U.S. Cl.
CPC ......... *B60R 13/0861* (2013.01); *B60R 13/0846* (2013.01); *B62D 25/16* (2013.01)

(58) Field of Classification Search
CPC .. B60R 13/08; B60R 13/0815; B60R 13/083; B60R 13/0838; B60R 13/0846; B60R 13/0861; B60R 2013/0807; B62D 25/08; B62D 25/16; B62D 25/165
See application file for complete search history.

(56) References Cited

U.S. PATENT DOCUMENTS

| 4,989,913 | A | * | 2/1991 | Moore, III | 296/205 |
| 5,806,915 | A | * | 9/1998 | Takabatake | 296/187.02 |
| 2003/0199191 | A1 | * | 10/2003 | Ward et al. | 439/402 |

(Continued)

FOREIGN PATENT DOCUMENTS

| DE | 3635240 A1 * | 12/1987 | ............. B60R 13/08 |
| DE | 4231049 A1 * | 3/1994 | ............. B62D 25/18 |

(Continued)

OTHER PUBLICATIONS

International Search Report; PCT/JP2012/004438; Sep. 18, 2012.

*Primary Examiner* — Glenn Dayoan
*Assistant Examiner* — Paul Chenevert
(74) *Attorney, Agent, or Firm* — Studebaker & Brackett PC (57) ABSTRACT

It is intended to provide a sound insulation structure for a vehicle, which is capable of adequately retaining an elongated line component, such as a wiring harness, a pipe or a cable, while suppressing deterioration in sound insulation performance by a sound insulator. In the sound insulation structure, a sound insulator is provided in a void space surrounded by: a front fender panel; a cowl side member disposed on a vehicle inward side with respect to the front fender panel to extend in a vehicle front-rear direction; and a mud guard disposed just below the front fender panel and the cowl side member to form a wheel housing. The sound insulator is formed using an elastically-deformable urethane foam. The sound insulator is formed with a slit capable of clamping a regenerative brake wiring harness laid to extend in the vehicle front-rear direction and pass through the void space.

3 Claims, 8 Drawing Sheets

(56) References Cited

U.S. PATENT DOCUMENTS

| | | | |
|---|---|---|---|
| 2006/0214474 A1* | 9/2006 | Omiya et al. | 296/198 |
| 2007/0122510 A1* | 5/2007 | Mendiboure et al. | 425/4 R |
| 2010/0003450 A1* | 1/2010 | Meyer | 428/99 |
| 2010/0243824 A1* | 9/2010 | Desai et al. | 248/65 |
| 2010/0319956 A1* | 12/2010 | Ballard et al. | 174/105 R |
| 2010/0320028 A1* | 12/2010 | Wojtowicki | 181/264 |
| 2012/0325519 A1* | 12/2012 | Igarashi et al. | 174/136 |
| 2013/0300156 A1* | 11/2013 | Tokuda | 296/193.07 |
| 2014/0028045 A1* | 1/2014 | Schaefer | 296/39.3 |

FOREIGN PATENT DOCUMENTS

| | | | | |
|---|---|---|---|---|
| DE | 19522895 A1 * | 1/1997 | | B60R 13/08 |
| DE | 102012023767 A1 * | 6/2014 | | F16B 5/06 |
| EP | 1384628 A2 * | 1/2004 | | B60R 16/02 |
| EP | 1426218 A1 * | 6/2004 | | B60J 5/04 |
| EP | 1975006 A1 * | 10/2008 | | B60R 13/08 |
| FR | 2132931 A5 * | 11/1972 | | B60R 13/08 |
| FR | 2868006 A1 * | 9/2005 | | B29C 44/18 |
| FR | 2935038 A1 * | 2/2010 | | F16L 59/02 |
| JP | 63-180451 U | 11/1988 | | |
| JP | 2000-177648 A | 6/2000 | | |
| JP | 2004-351966 A | 12/2004 | | |
| JP | 2007-090999 A | 4/2007 | | |
| JP | 2007-106361 A | 4/2007 | | |
| JP | 2007-112298 A | 5/2007 | | |
| JP | 2010-120422 A | 6/2010 | | |
| WO | WO 2014038259 A1 * | 3/2014 | | B60R 16/02 |

\* cited by examiner

SOUND INSULATION STRUCTURE FOR VEHICLE

This application is based on Japanese Patent Application Serial No. 2011-168465 filed in Japan Patent Office on Aug. 1, 2011, the contents of which are hereby incorporated by reference.

TECHNICAL FIELD

The present invention relates to a sound insulation structure for a vehicle, in which a sound insulator is provided in a void space surrounded by a front fender panel, a cowl side member and a mud guard.

BACKGROUND ART

As a measure to prevent engine sound, road noise from front tires (front wheels), i.e., noise received from a road surface (so-called "tire noise"), and others, from intruding into a passenger compartment through a front fender area in a front of a vehicle, there has been generally known a technique of providing a sound insulator in a void space located just above a front wheel and surrounded by: a front fender panel; a cowl side member disposed on a vehicle inward side with respect to the front fender panel to extend in a vehicle front-rear direction; and a mud guard disposed just below the front fender panel and the cowl side member to form a wheel housing.

The Patent JP 2000-177648 discloses a structure configured such that a clip is locked to a joint flange extending downwardly from a lower end of a frame member (equivalent to the cowl side member) formed of a hood ridge member and a hood ridge reinforcement member to extend along a lateral edge of an upper portion in a front of a vehicle body, wherein the clip is formed with a bottom portion extending from the joint flange toward a front fender panel provided outward of the frame member to support a sound insulator from therebelow, whereby the sound insulator can be installed in a void space formed between the frame member and the front fender panel.

In this structure, it is desired to completely close the void space by the sound insulator, in view of preventing sound intrusion into a passenger compartment. However, if the void space is completely closed by the sound insulator, a problem occurs in a situation where an elongated line component, such as a wiring harness, a pipe or a cable, to be laid to extend in a vehicle front-rear direction, passes through the void space, i.e., the laying of the line component becomes difficult.

SUMMARY OF THE INVENTION

It is therefore an object of the present invention to provide a sound insulation structure for a vehicle, which is capable of adequately retaining an elongated line component such as a wiring harness, while suppressing deterioration in sound insulation performance by a sound insulator.

Specifically, the present invention provides a sound insulation structure for a vehicle, in which a sound insulator is provided in a void space surrounded by: a front fender panel; a cowl side member disposed on a vehicle inward side with respect to the front fender panel to extend in a vehicle front-rear direction; and a mud guard disposed just below the front fender panel and the cowl side member to form a wheel housing, wherein the sound insulator is formed using an elastically-deformable material, and formed with a slit capable of clamping an elongated line component laid to extend in the vehicle front-rear direction and pass through the void space.

These and other objects, features, and advantages of the present invention will become apparent upon reading of the following detailed description along with the accompanying drawings.

DESCRIPTION OF EMBODIMENTS

One embodiment of the present invention will now be described in detail, based on the drawings. In the figures, the arrowed line F, the arrowed line R, the arrowed line IN, the arrowed line OUT and the arrowed line UP indicate, respectively, a vehicle frontward side, a vehicle rearward side, a vehicle inward side in a vehicle width direction, a vehicle outward side in the vehicle width direction and a vehicle upward side.

Figure 1:
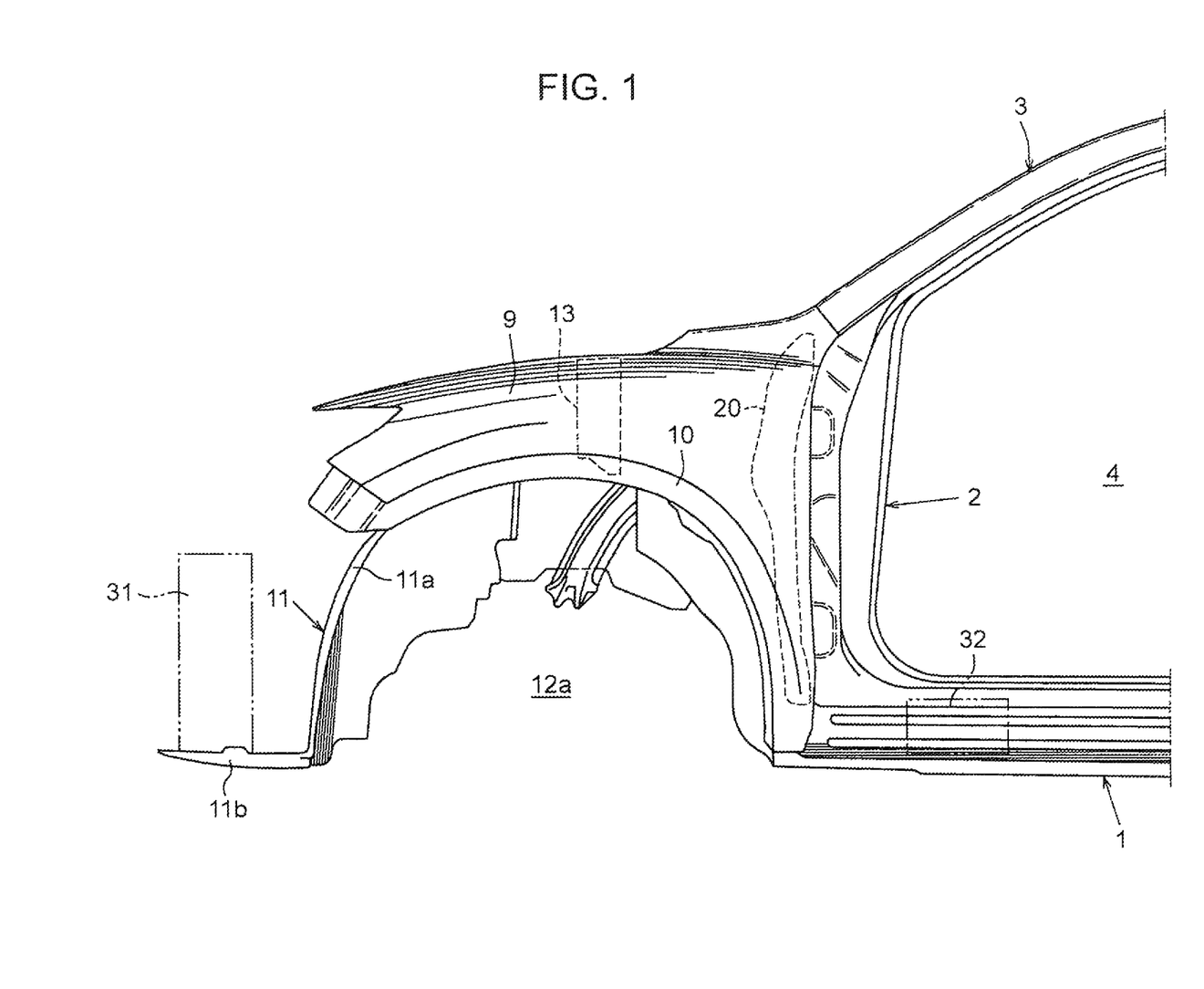
FIG. 1 is a fragmentary left side view of a front of a vehicle, having a sound insulation structure according to one embodiment of the present invention.
Figure 2:
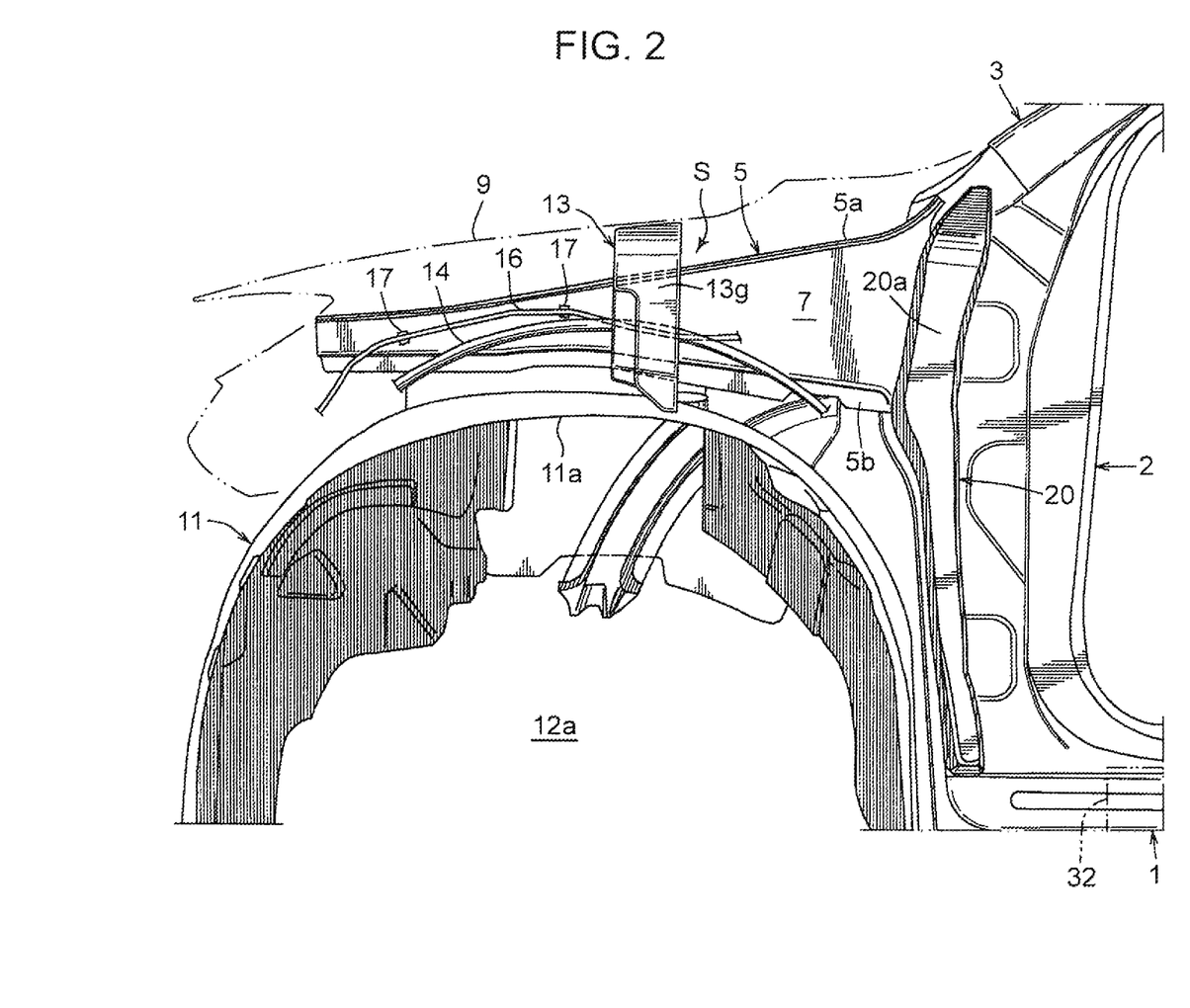
FIG. 2 is a fragmentary left side view of the vehicle front in a state in which a front fender panel is removed.
Figure 3:
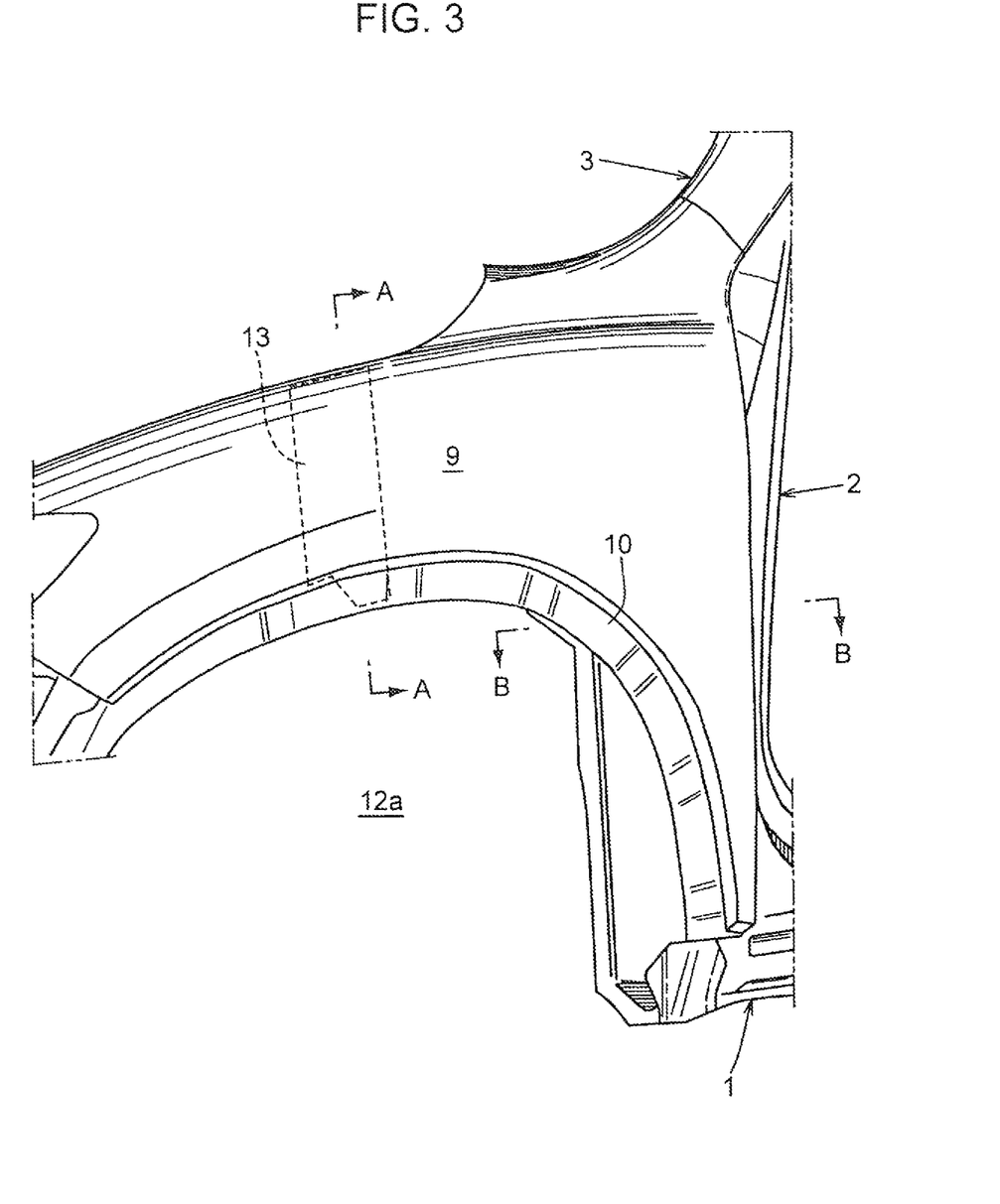
FIG. 3 is an enlarged view of a substantial part in FIG. 1.
Figure 4:
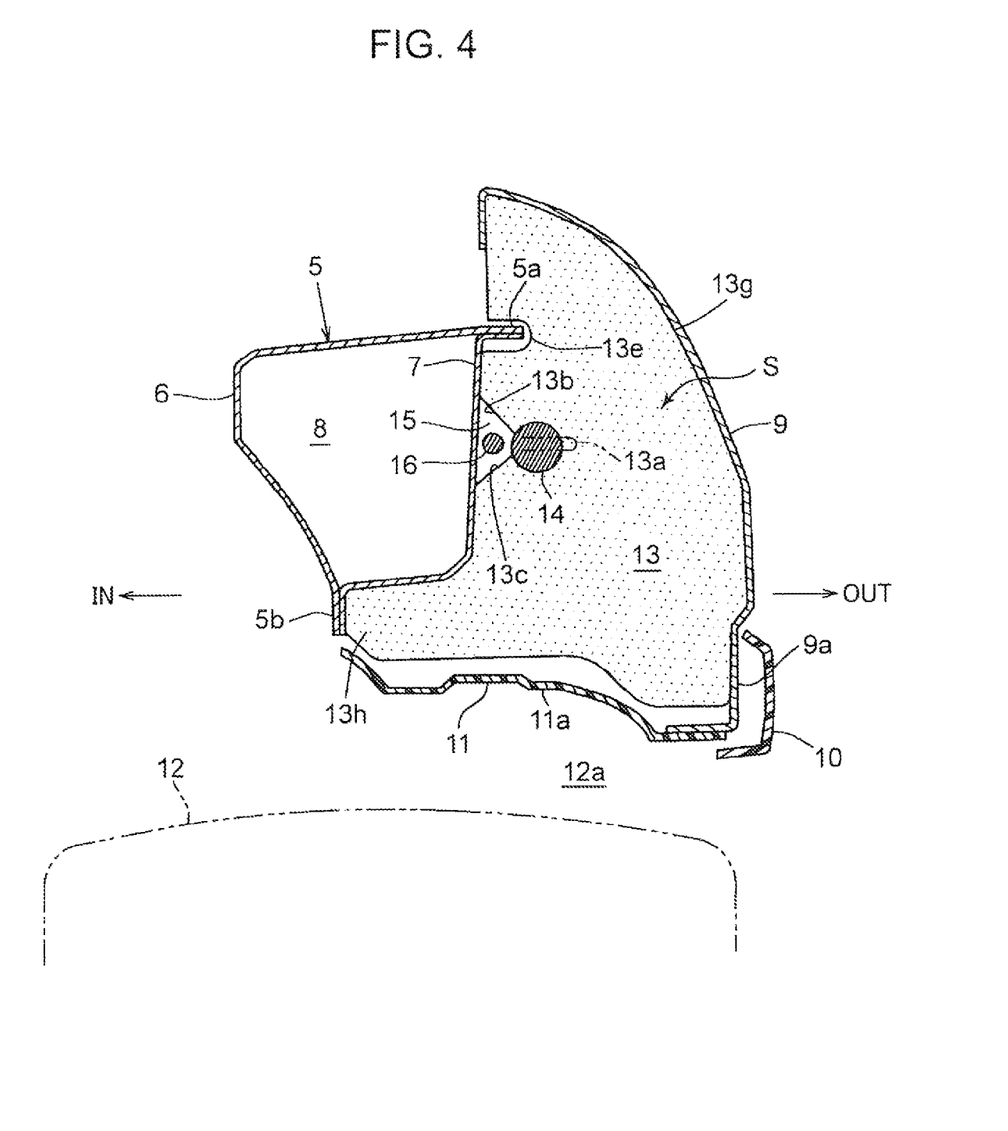
FIG. 4 is a sectional view taken along the arrowed line A-A in FIG. 3.

FIG. 1 is a fragmentary left side view of a front of a vehicle, having a sound insulation structure according to one embodiment of the present invention, FIG. 2 is a fragmentary left side view of the vehicle front in a state in which a front fender panel is removed (wherein the front fender panel is indicated by the two-dot chain line), FIG. 3 is an enlarged view of a substantial part in FIG. 1, and FIG. 4 is a sectional view taken along the arrowed line A-A in FIG. 3. In this embodiment, the sound insulation structure is provided on right and left sides of the vehicle front in approximately bilaterally symmetrical relation. Thus, although only the left sound insulation structure will be described, while omitting description of the right sound insulation structure, the right sound insulation structure is structurally the same as the left sound insulation structure.

As illustrated in FIGS. 1 and 2, the vehicle front in this embodiment is provided with: a side sill 1 which comprises a side sill inner panel and a side sill outer panel and extends in a vehicle front-rear direction; a hinge pillar 2 which comprises a hinge pillar inner panel and a hinge pillar outer panel (see FIG. 7) and extends in a vehicle up-down direction; and a front pillar 3 which comprises a front pillar inner panel and a front pillar outer panel and extends obliquely upwardly in a direction from a vehicle frontward side to a vehicle rearward side thereof. Each of the side sill 1, the hinge pillar 2 and the front pillar 3 is a vehicle-body rigidity member having a closed cross-sectional structure. These vehicle-body rigidity members 1, 2, 3 are connected together as illustrated in FIG. 1 to form a door opening 4 for a front seat occupant.

As illustrated in FIGS. 2 and 4, a cowl side member 5 is provided on each of right and left lateral sides of an upper region of an engine compartment (not illustrated) to extend in the vehicle front-rear direction. The cowl side member 5 is a vehicle-body rigidity member in which a cowl side member inner panel 6 and a cowl side member outer panel 7 are joined together through an upper joint flange 5a and a lower joint flange 5b to form a cowl-side closed cross-sectional space 8 extending in the vehicle front-rear direction. The upper joint flange 5a extends in a vehicle width direction, and the lower joint flange 5b extends in the vehicle up-down direction.

As illustrated in FIG. 4, a front fender panel 9 is provided on a vehicle-widthwise outward side with respect to the cowl side member 5 to cover each of right and left lateral sides of the engine compartment. An over fender 10 is attached onto a vehicle-widthwise outward surface of a wheel arch portion 9a of the front fender panel 9. The over fender 10 is made, for example, of a synthetic resin material, and formed in an arch shape in a side view of the vehicle, as illustrated in FIGS. 1 and 3.

As illustrated in FIG. 4, a mud guard 11 is provided just below the front fender panel 9 and the cowl side member 5 to form a wheel housing 12a for receiving therein a front wheel 12. The mud guard 11 is made, for example, of a synthetic resin material, and formed to cover front, upper and rear sides of the front wheel 12 in spaced-apart relation to an outer periphery of the front wheel 12. As illustrated in FIGS. 1 and 2, the mud guard 11 has a wheel arch portion 11a formed along the wheel arch portion 9a of the front fender panel 9 (see FIG. 4), in an arch shape in the side view of the vehicle.

As illustrated in FIG. 4, a void space S surrounded by: the front fender panel 9; the cowl side member 5 disposed on the vehicle-widthwise inward side with respect to the front fender panel 9 to extend in the vehicle front-rear direction; and the mud guard 11 disposed just below the front fender panel 9 and the cowl side member 5 to form the wheel housing 12a, is formed just above the front wheel 12 in the vehicle front. Then, a sound insulator 13 is provided in the void space S. More specifically, the sound insulator 13 is provided in the void space S, in a vehicle front-rear directional intermediate region of the front fender panel 9, preferably, in a region where at least one of a vehicle-widthwise width dimension and a vehicle up-down directional height dimension of the void space S is minimized. The sound insulator 13 is formed using an elastically-deformable material. That is, the sound insulator 13 is formed using a material capable of generating a reaction force when compressed. Examples of such a material include: foams, such as urethane foam; sponges, such as urethane sponge; and rubbers, such as silicone rubber. The sound insulator 13 may be a type having a sound absorbing function in addition to a sound insulating function. The sound insulator 13 is fixed in the void space S by means of a reaction force generated when compressed. The void space S will hereinafter be described as "sound insulation space S".

Figure 5:
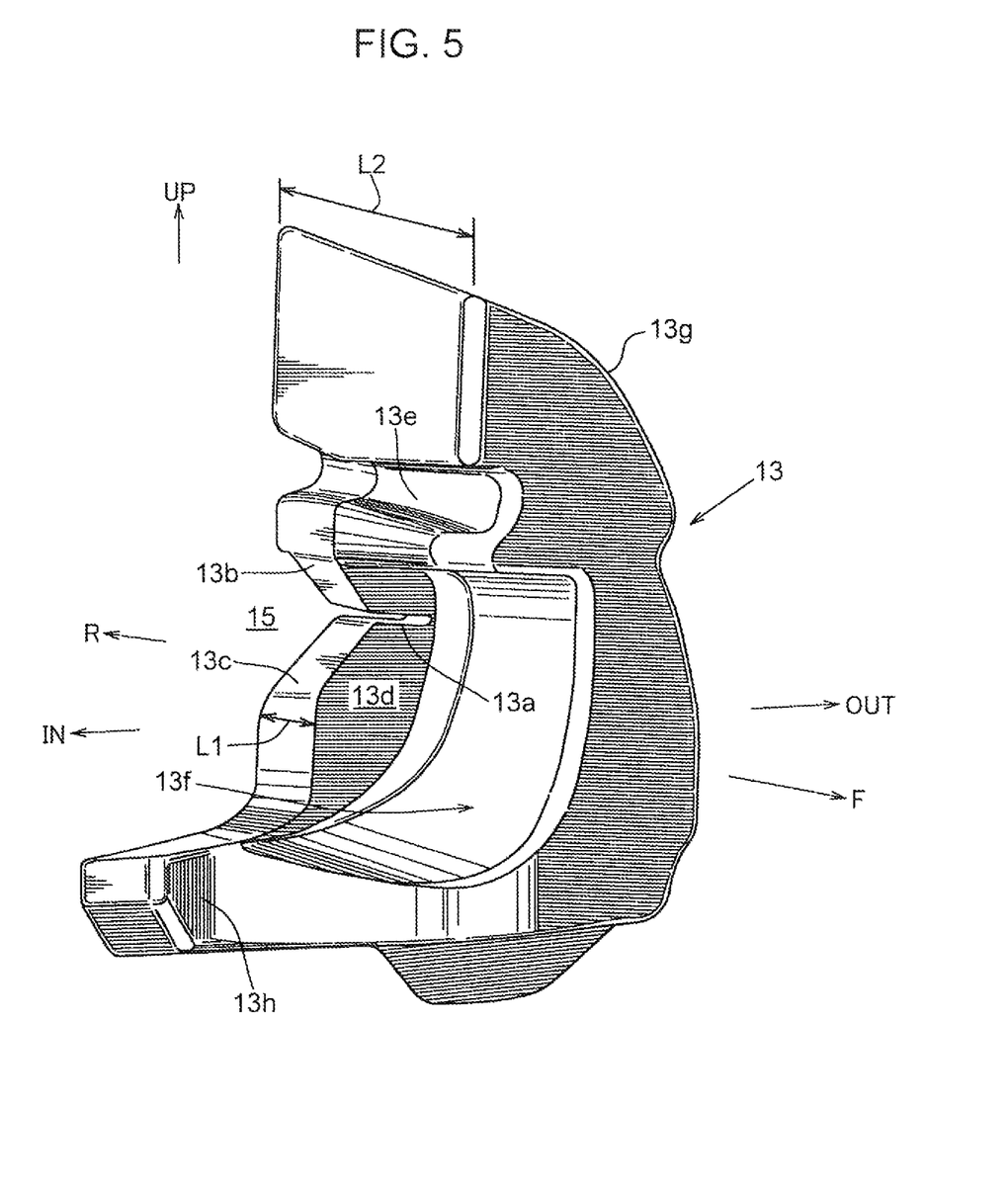
FIG. 5 is a perspective view of a left sound insulator used in the sound insulation structure.

FIG. 5 is a perspective view separately illustrating a left sound insulator 13. As illustrated in FIGS. 4 and 5, the sound insulator 13 is formed with a slit 13a. In this embodiment, the slit 13a is formed to extend from a surface of the sound insulator 13 on the side of the cowl side member 5 toward the front fender panel 9, in the vehicle width direction. In the case where an elongated line component, such as a wiring harness, a pipe or a cable, is laid to extend in the vehicle front-rear direction and pass through the sound insulation space S, the slit 13a is configured to be able to clamp the elongated line component. In this embodiment, the elongated line component is a regenerative brake wiring harness 14 (see FIG. 2).

Figure 6:
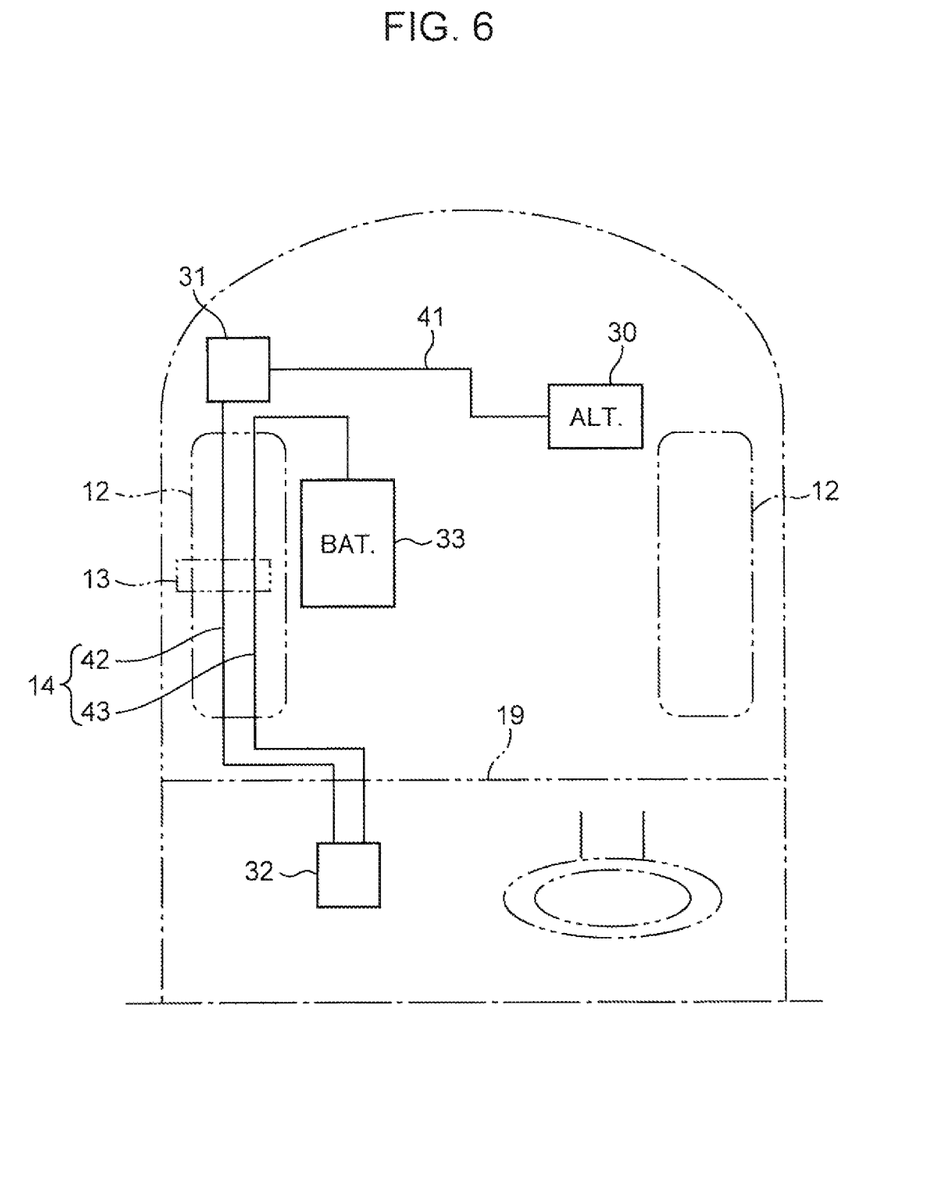
FIG. 6 is a layout diagram illustrating a configuration and interconnection of an electrical system of the vehicle, in the form of a top plan view of the vehicle.

With reference to FIG. 6, the regenerative brake wiring harness 14 will be described. As illustrated in FIG. 6, an electrical system of the vehicle in this embodiment comprises an electric power supply device 30, an electric power storage device 31, an electric power control device 32, a battery 33, a first wiring harness 41, a second wiring harness 42, and a third wiring harness 43.

In the vehicle front, the electric power supply device 30 is disposed in the engine compartment frontward of a dash panel 19 at a position on a relatively right side. Examples of the electric power supply device 30 include an alternator.

The electric power storage device 31 is disposed frontward of the left front wheel 12 received in the left wheel housing 12a. Examples of the electric power storage device 31 include: various types of secondary batteries, such as a nickel-hydrogen secondary battery; and a capacitor, such as an electric double layer capacitor. The electric power storage device 31 is supplied with electric power from the electric power supply device 30. For example, the electric power storage device 31 is placed on a frontward extension portion 11b provided at a front end of the mud guard 11, as illustrated in FIG. 1.

The electric power control device 32 is disposed rearward of the left front wheel 12. More specifically, it is disposed in a passenger compartment rearward of the dash panel 19 at a position on a relatively left side. The electric power supply device 32 is supplied with electric power from the electric power storage device 31. The electric power supply device 32 is operable to lower a supplied voltage to a given voltage through a DC-DC converter (not illustrated), and then supply the given voltage to various vehicle-installed electric components, such as an air-conditioning unit. For example, the electric power supply device 32 is placed on a floor panel (not illustrated) located at a bottom of the passenger component, as illustrated in FIG. 1.

The battery 33 is disposed in the engine compartment at a position on a relatively left side. Examples of the battery 33 include a lead battery. The battery 33 is supplied with surplus electric power from the electric power control device 32.

The first wiring harness 41 is laid to extend in the vehicle width direction and connect between the electric power supply device 30 and the electric power storage device 31. The second wiring harness 42 is laid to extend in the vehicle front-rear direction and connect between the electric power storage device 31 and the electric power control device 32. The third wiring harness 43 is laid to extend in the vehicle front-rear direction and connect between the electric power control device 32 and the battery 33. The second wiring harness 42 and the third wiring harness 43 are arranged to extend in a range from a position in front of the left front wheel 12 to a position behind the left front wheel 12, i.e., across the left front wheel 12 in the vehicle front-rear direction, while passing just above the left front wheel 12, and bound together into a single bundle, in the above range. The regenerative brake wiring harness 14 means the bundle of the wiring harnesses 42, 43.

As illustrated in FIG. 2, the regenerative brake wiring harness 14 is laid to extend along the wheel arch portion 11a of the mud guard 11. The wiring harness 14 passes through the sound insulation space S formed just above the left front wheel 12, in the vehicle front-rear direction. As illustrated in FIG. 4, when the wiring harness 14 passes through the sound insulation space S, it is clamped by the slit 13a of the sound insulator 13 provided in the sound insulation space S. Therefore, the wiring harness 14 is adequately retained within the sound insulation space S by the sound insulator 13.

In this embodiment, the electric power storage device 31 is disposed frontward of the front wheel 12. This has an advantage of allowing the electric power storage device 31 to be efficiently cooled by vehicle-running wind. Further, the electric power storage device 31 and the electric power control device 32 connected by the second wiring harness 42 are arranged on the same side in the vehicle width direction (on the left side). This has an advantage of being able to reduce a length of the second wiring harness 42, thereby suppressing an increase in electrical resistance. In this embodiment, the second wiring harness 42 connecting between the electric power storage device 31 and the electric power control device 32 has a relatively large diameter. Thus, the regenerative brake wiring harness 14 formed by binding the second wiring harness 42 and the third wiring harness 43 together into the single bundle has a larger diameter.

Depending on a type of vehicle, there are two cases: one where the regenerative brake wiring harness 14 is laid; and the other where the regenerative brake wiring harness 14 is not laid. In a vehicle where the regenerative brake wiring harness 14 is laid, the wiring harness 14 can be adequately retained within the sound insulation space S by using the slit 13a, while sufficiently suppressing deterioration in sound insulation performance by the sound insulator 13, because the slit 13a is thin, i.e., an opening area of the slit 13a is sufficiently small as compared to a cross-sectional area (more specifically, a vertical cross-sectional area in the vehicle front-rear direction; this also applies to the following) of the sound insulation space S. On the other hand, in a vehicle where the regenerative brake wiring harness 14 is not laid, it is possible to sufficiently suppress deterioration in sound insulation performance by the sound insulator 13, because the opening area of the slit 13a is sufficiently small as compared to the cross-sectional area of the sound insulation space S. Therefore, irrespective of whether or not the regenerative brake wiring harness 14 is laid, the sound insulator 13 can be used in common to promote common use of components.

A vehicle-widthwise distance between the cowl side member 5 and the front fender panel 9 is relatively large, so that the sound insulator 13 can be formed to have a relatively large thickness in the vehicle width direction. Thus, a depth of the slit 13a can be sufficiently increased by forming the slit 13a to extend from the surface of the sound insulator 13 on the side of the cowl side member 5 toward the front fender panel 9, in the vehicle width direction.

As illustrated in FIGS. 4 and 5, a guiding cavity 15 is formed on the side of an inlet of the slit 13a of the sound insulator 13, i.e., on the side of the cowl side member outer panel 7 to have an upper inclined surface 13b and a lower inclined surface 13c for guiding the regenerative brake wiring harness 14 insertably toward the slit 13a. The upper inclined surface 13b and the lower inclined surface 13c are formed in a taper shape where a vehicle up-down directional distance between the inclined surfaces 13b, 13c gradually increases toward the cowl side member outer panel 7, and gradually decreases toward the slit 13a, i.e., formed in a lying-V shape. Therefore, the guiding cavity 15 functions as guide means to lead the regenerative brake wiring harness 14 during insertion into the slit 13a.

As illustrated in FIG. 4, the guiding cavity 15 is formed to be capable of housing an additional elongated line component laid to extend in the vehicle front-rear direction and pass through the sound insulation space S. In this embodiment, the additional elongated line component is a cable for opening a bonnet or hood, i.e., a bonnet opener cable 16 (see FIG. 2).

As illustrated in FIG. 2, the bonnet opener cable 16 is retained at a plurality of positions by clips 17 each attached to the cowl side member outer panel 7 to serve as a retainer.

As illustrated in FIG. 5, the sound insulator 13 is formed in a block shape as a whole (e.g., a urethane foam block body). The sound insulator 13 comprises a vertical wall portion 13d, a groove portion 13e, a concave portion 13f, a back portion 13g, and a lower portion 13h.

The vertical wall portion 13d is partially provided on a rear side of the sound insulator 13, i.e., the vertical wall portion 13d has a vehicle front-rear directional length L1 less than a vehicle front-rear directional length L2 of the sound insulator 13. The vertical wall portion 13d is formed with the slit 13a, the inclined surfaces 13b, 13c, and the guiding cavity 15. This facilitates deformation of the slit 13a and thus facilitates an operation of clampingly inserting the wiring harness 14 into the slit 13a. As illustrated in FIG. 4, a surface of the vertical wall portion 13d on the side of the cowl side member 5 is in contact with a lateral surface of the cowl side member 5.

The groove portion 13e is provided in the sound insulator 13 at a position on the side of the cowl side member 5 and above the slit 13a to extend in the vehicle front-rear direction and have a vehicle front-rear directional length L2 equal to the vehicle front-rear directional length L2 of the sound insulator 13. As illustrated in FIG. 4, the sound insulator 13 is held with respect to a vehicle body in a state in which the upper joint flange 5a of the cowl side member 5 is disposed in the groove portion 13e.

The concave portion 13f is partially provided on a front side of the sound insulator 13, in adjacent relation to the vertical wall portion 13d. The concave portion 13f is a hollowed space in the sound insulator 13. This facilitates a reduction in weight of the sound insulator 13.

The back portion 13g is a portion of the sound insulator 13 provided on the side of the front fender panel 9 to come into surface contact with an inner surface of the front fender panel 9, i.e., a contact surface with the front fender panel 9. As illustrated in FIGS. 2 and 4, the back portion 13g is formed as a smooth surface. The reason is as follows. The front fender panel 9 has a plate thickness less than that of the cowl side member 5, so that, when rust occurs, the front fender panel 9 is more likely to be influenced by the rust. For example, if the back portion 13g is formed with irregularities, water will be accumulated between the sound insulator 13 and the front fender panel 9, so that rust becomes more likely to occur in the front fender panel 9. Therefore, the back portion 13g is formed as a smooth, irregularity-free surface, thereby suppressing the occurrence of rust.

The lower portion 13h is provided just below the vertical wall portion 13d to protrude toward the cowl side member 5. As illustrated in FIG. 4, an upper surface of the lower portion 13h is in contact with a lower surface of the cowl side member 5.

As illustrated in FIG. 4, the sound insulator 13 completely closes the sound insulation space S surrounded by the front fender panel 9, the cowl side member 5 and the mud guard 11, except the groove portion 13e, the guiding cavity 15, the slit 13a, and a part of the void space just above the mud guard 11. Therefore, it becomes possible to suppress deterioration in sound insulation performance by the sound insulator 13.

In this embodiment, in addition to the above-described sound insulator 13, an additional second sound insulator is used in the sound insulation structure. The second sound insulator will be described below.

Figure 7:
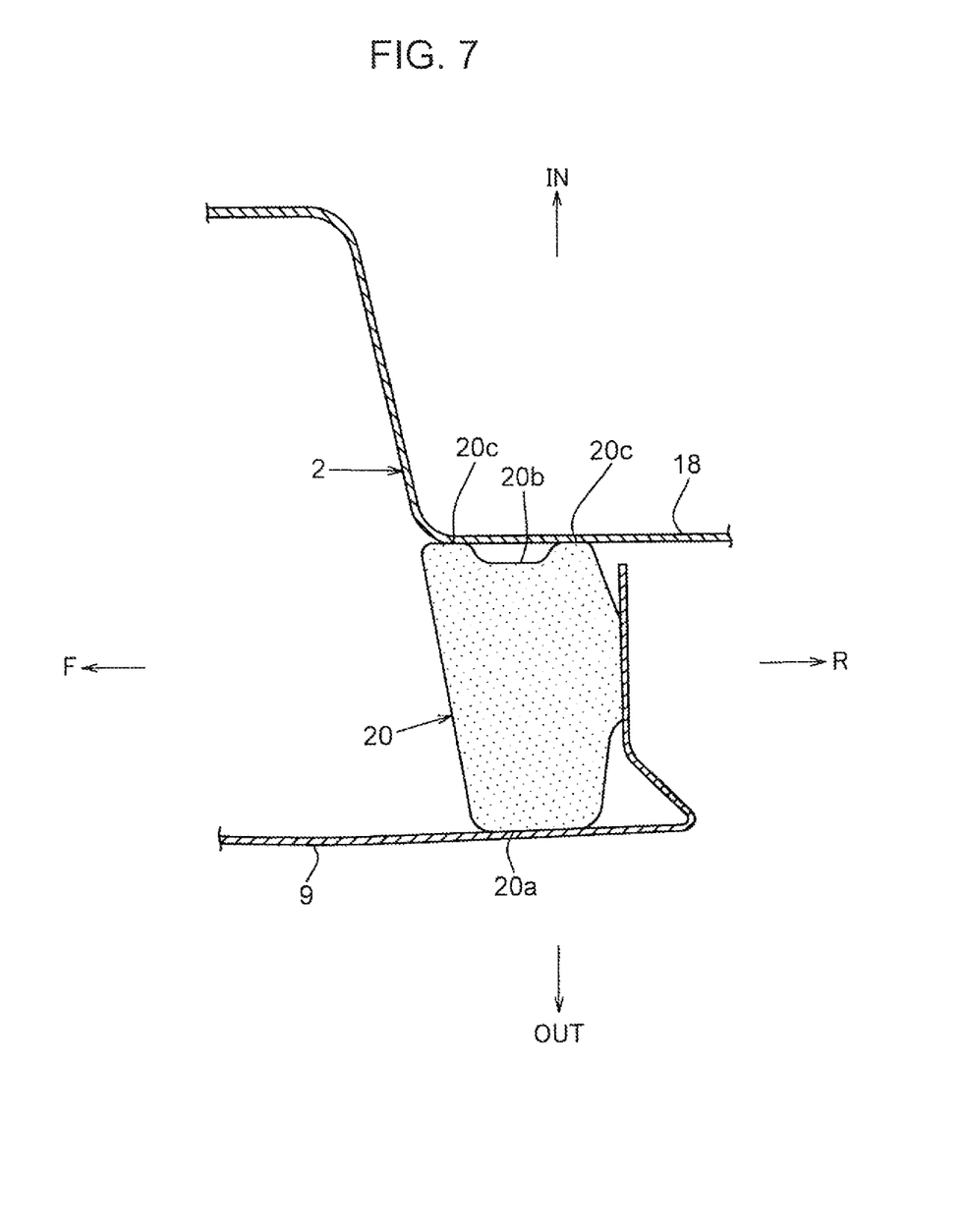
FIG. 7 is a sectional view taken along the arrowed line B-B in FIG. 3.
Figure 8:
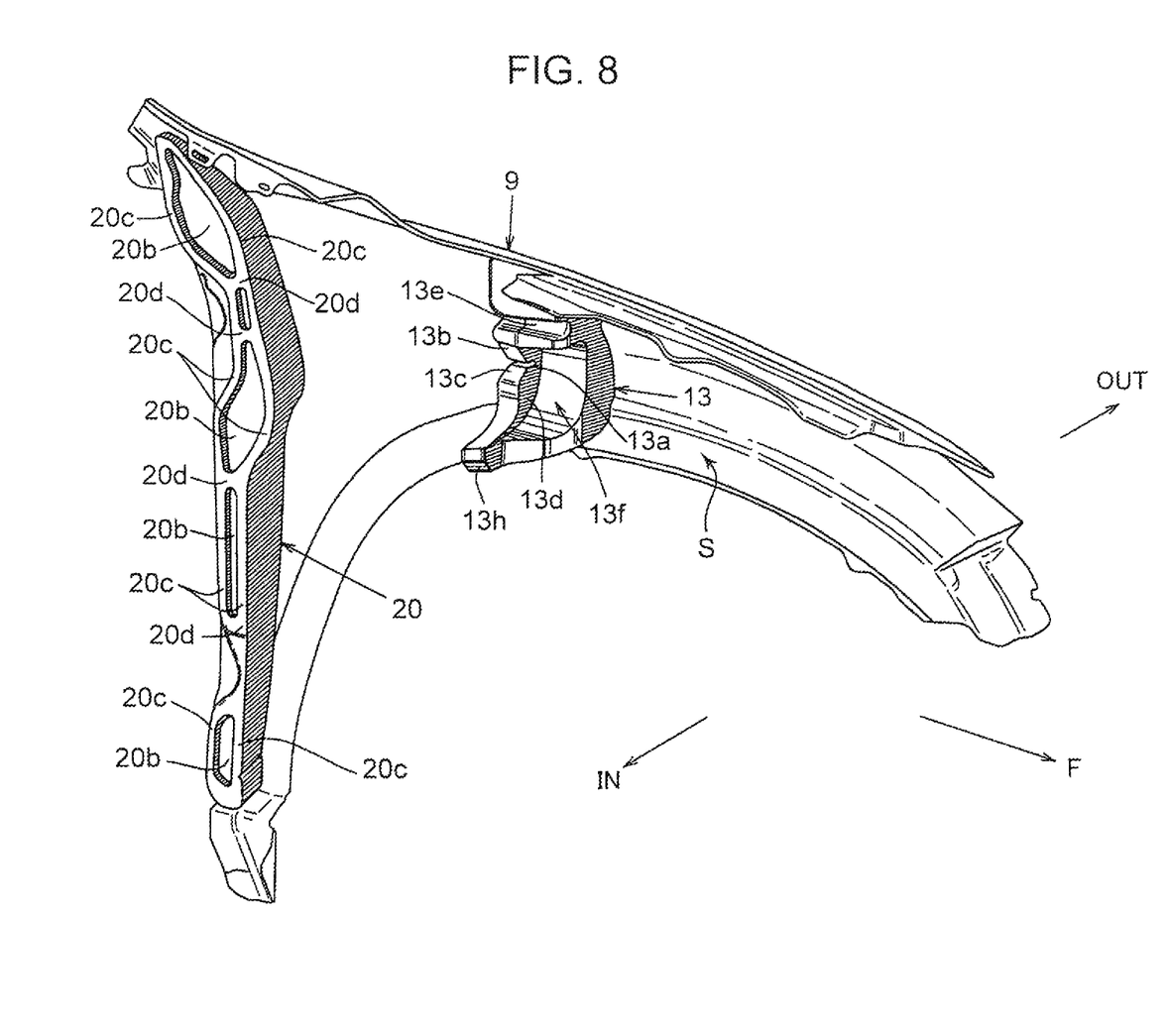
FIG. 8 is a perspective view illustrating two types of left sound insulators used in the sound insulation structure, when viewing a back side of a left front fender panel of the vehicle from a frontward side.

FIG. 7 is a sectional view taken along the arrowed line B-B in FIG. 3, and FIG. 8 is a perspective view illustrating two types of left sound insulators used in the sound insulation structure, when viewing a back side of the left front fender panel of the vehicle from a frontward side.

As illustrated in FIG. 7, the hinge pillar 2 comprises the hinge pillar outer panel 18. As illustrated in FIGS. 1 and 2, the hinge pillar 2 is disposed in a rear end of the front fender panel 9 at a position on the vehicle inward side with respect to the front fender panel 9, to extend in the vehicle up-down direction. In a region where the hinge pillar 2 is located, a second sound insulator 20 is provided between the front fender panel 9, and the hinge pillar outer panel 18 or the hinge pillar 2, extending in the vehicle up-down direction. As illustrated in FIGS. 1 and 2, the second sound insulator 20 extends in the vehicle up-down direction between a vicinity of a lower end of the front pillar 3 and a vicinity of an upper end of the side sill 1.

As with the sound insulator 13, the second sound insulator 20 is formed using an elastically-deformable material. That is, the second sound insulator 20 is formed using a material capable of generating a reaction force when compressed. Examples of such a material include: foams, such as urethane foam; sponges, such as urethane sponge; and rubbers, such as silicone rubber. The second sound insulator 20 may be a type having a sound absorbing function in addition to a sound insulating function. The second sound insulator 20 is fixed between the front fender panel 9 and the hinge pillar outer panel 18 by means of a reaction force generated when compressed.

As illustrated in FIGS. 7 and 8, the second sound insulator 20 is formed in an approximately quadrangular cross-sectional shape in top plan view, which has a given width in the vehicle front-rear direction, and a given thickness in the vehicle width direction. The second sound insulator 20 has a contact surface 20a (see FIG. 2) in surface contact with the inner surface of the front fender panel 9, and contact portions 20c, 20c in contact with the hinge pillar outer panel 18.

As illustrated in FIG. 2, the contact surface 20a is formed as a smooth surface. The reason is as follows. The front fender panel 9 has a plate thickness less than that of the hinge pillar outer panel 18, so that, when rust occurs, the front fender panel 9 is more likely to be influenced by the rust. For example, if the contact surface 20a is formed with irregularities, water will be accumulated between the second sound insulator 20 and the front fender panel 9, so that rust becomes more likely to occur in the front fender panel 9. Therefore, the contact surface 20a is formed as a smooth, irregularity-free surface, thereby suppressing the occurrence of rust.

As illustrated in FIGS. 7 and 8, the contact portions 20c, 20c are composed of a plurality of line-shaped protrusions provided in spaced-apart relation to each other by a given distance in the vehicle front-rear direction and each extending in the vehicle up-down direction. The contact portions 20c, 20c are coupled together in the vehicle front-rear direction at a plurality of positions in the vehicle up-down direction through a plurality of coupling portions 20d extending in the vehicle front-rear direction. In this way, a plurality of recesses 20b surrounded by the contact portions 20c, 20c and the coupling portions 20d are formed in a surface of the second sound insulator 20 on the side of the hinge pillar 2, in side-by-side relation in the vehicle up-down direction. The reason is as follows. When the second sound insulator 20 is clamped between the front fender panel 9 and the hinge pillar 2 by a compressive reaction force, each of the contact portions 20c, 20c is apt to undergo buckling deformation (so-called "collapse"), and, if the buckling deformation occurs, it becomes impossible to ensure an adequate compressive reaction force of the second sound insulator 20. Therefore, with a view to suppressing this problem, the contact portions 20c, 20c each extending in the vehicle up-down direction are coupled together by the coupling portions 20d each extending in the vehicle front-rear direction. Thus, the coupling portions 20d support the contact portions 20c to suppress buckling deformation of the contact portions 20c.

As illustrated in FIG. 7, the second sound insulator 20 is formed such that, in the approximately quadrangular cross-sectional shape in top plan view, a surface of the second sound insulator 20 located on the side of the hinge pillar 2 and formed with the contact portions 20c, the coupling portions 20d and the recesses 20b has a vehicle front-rear directional width greater than that of a surface (contact surface 20a) of the second sound insulator 20 on the side of the front fender panel 9. This makes it possible to achieve further enhanced performance for insulating sound, such as engine sound and road noise, from a passenger compartment.

As above, in a sound insulation structure for a vehicle, according to the above embodiment, a sound insulator 13 is provided in a sound insulation space S surrounded by: a front fender panel 9; a cowl side member 5 disposed on a vehicle inward side with respect to the front fender panel 9 to extend in a vehicle front-rear direction; and a mud guard 11 disposed just below the front fender panel 9 and the cowl side member 5 to form a wheel housing 12a. The sound insulator 13 is formed using an elastically-deformable material, such as urethane foam. The sound insulator 13 is formed with a slit 13a capable of clamping a regenerative brake wiring harness 14 which is an elongated line component laid to extend in the vehicle front-rear direction and pass through the sound insulation space S (see FIGS. 4 and 5).

In this sound insulation structure, the sound insulator 13 is provided in the sound insulation space S surrounded by the front fender panel 9, the cowl side member 5 and the mud guard 11, on an upper side of a front wheel 12 in a front of the vehicle, and the slit 13a capable of clamping the regenerative brake wiring harness 14 is formed in the sound insulator 13, so that the regenerative brake wiring harness 14 laid to extend in the vehicle front-rear direction and pass through the sound insulation space S can be clamped using the slit 13a by clampingly inserting the regenerative brake wiring harness 14 into the slit 13a. Therefore, it becomes possible to adequately retain the regenerative brake wiring harness 14 within the sound insulation space S, and suppress, for example, a problem that the wiring harness 14 is rubbed and damaged due to vibration thereof during running of the vehicle. In addition, the slit 13a is thin, i.e., an opening area of the slit 13a is sufficiently small as compared to a cross-sectional area of the sound insulation space S, so that it becomes possible to sufficiently suppress deterioration in sound insulation performance by the sound insulator 13. Furthermore, when the wiring harness 14 is clampingly inserted into the slit 13a, a part or entirety of the slit 13a is filled with the wiring harness 14, so that it becomes possible to further suppress the deterioration in sound insulation performance by the sound insulator 13. In short, it becomes possible to adequately retain the regenerative brake wiring harness 14 within the sound insulation space S while suppressing the deterioration in sound insulation performance by the sound insulator 13.

Further, depending on a type of vehicle, there are two cases: one where the regenerative brake wiring harness 14 is laid; and the other where the regenerative brake wiring harness 14 is not laid. However, even in a vehicle where the regenerative brake wiring harness 14 is not laid, it is possible to sufficiently suppress the deterioration in sound insulation performance by the sound insulator 13, because the opening area of the slit 13a is sufficiently small as compared to the cross-sectional area of the sound insulation space S. That is, even when the slit 13a formed in the sound insulator 13 to clamp the wiring harness 14 is not used, sound leakage can be minimized, because the slit 13a is thin, i.e., the opening area thereof is sufficiently small.

The sound insulation structure according to the above embodiment comprises a guiding cavity 15 formed on the side of an inlet of the slit 13a to have two inclined surfaces 13b, 13c for guiding the regenerative brake wiring harness 14 insertably toward the slit 13a (see FIGS. 4 and 5).

According to this feature, the guiding cavity 15 having the inclined surfaces 13b, 13c guides the regenerative brake wiring harness 14 insertably toward the slit 13a, so that it becomes possible to facilitate an operation of clampingly inserting the regenerative brake wiring harness 14 into the slit 13a.

In the above embodiment, the guiding cavity 15 is formed to be capable of housing a bonnet opener cable 16 which is an additional elongated line component laid to extend in the vehicle front-rear direction and pass through the sound insulation space S (see FIG. 4).

According to this feature, the guiding cavity 15 for guiding the regenerative brake wiring harness 14 insertably toward the slit 13a is additionally used, i.e., effectively utilized, as a space for housing the bonnet opener cable 16 which is an additional elongated line component different from the regenerative brake wiring harness 14.

In the above embodiment, the slit 13a is formed to extend from a surface of the sound insulator 13 on the side of the cowl side member 5 toward the front fender panel 9, in a vehicle width direction (see FIGS. 4, 5 and 8).

A vehicle-widthwise distance between the cowl side member 5 and the front fender panel 9 is relatively large, so that the sound insulator 13 can be formed to have a relatively large thickness in the vehicle width direction. Thus, according to the above feature, a depth of the slit 13a can be sufficiently increased. Therefore, even when the regenerative brake wiring harness 14 has a relatively large diameter, it becomes possible to adequately clamp and stably retain the wiring harness 14 by the slit 13a. For comparison, while the sound insulator 13 has a lower portion 13h disposed under the cowl side member 5, the lower portion 13h cannot be formed to have a sufficiently large thickness in a vehicle up-down direction, because a vehicle up-down directional distance between the cowl side member 5 and the mud guard 11 is relatively small. Thus, when a slit for clamping the wiring harness 14 is formed in the lower portion 13h in the vehicle up-down direction, a depth of the slit cannot be sufficiently increased. Further, a retainer for retaining the regenerative brake wiring harness 14, such as a fastener or a clip, is attached to the cowl side member outer panel 7 of the cowl side member 5. Thus, according to the above feature, it becomes possible to facilitate an operation of retaining the regenerative brake wiring harness 14 by the retainer, thereby further facilitating the laying of the wiring harness 14.

In the above embodiment, the vehicle is equipped with an electric power storage device 31 disposed frontward of a front wheel 12 received in the wheel housing 12a, an electric power control device 32 disposed rearward of the front wheel 12, and a second wiring harness 42 connecting between the electric power storage device 31 and the electric power control device 32, wherein a regenerative brake wiring harness 14 formed by binding the second wiring harness 42 and a third wiring harness 43 together into a single bundle is clamped by the slit 13a (see FIGS. 4 and 6).

According to this feature, in the sound insulation structure for the vehicle comprising the electric power storage device 31 disposed frontward of the front wheel 12 and thereby having an advantage of allowing the electric power storage device 31 to be efficiently cooled by vehicle running wind, it becomes possible to adequately retain the regenerative brake wiring harness 14 within the sound insulation space S above the front wheel 12 in the front of the vehicle while suppressing the deterioration in sound insulation performance by the sound insulator 13. Further, the regenerative brake wiring harness 14 formed by binding the second wiring harness 42 connecting between the electric power storage device 31 and the electric power control device 32, and the third wiring harness 43 together into a single bundle, has a relatively large diameter, so that an effective cross-sectional area of the sound insulation space S is further reduced by the thick regenerative brake wiring harness 14 passing through the sound insulation space S, which provides an advantage of being able to enhance the sound insulation performance.

In the above embodiment, the regenerative brake wiring harness 14 is laid to extend along a wheel arch portion 11a of the mud guard 11 (see FIG. 2).

According to this feature, the regenerative brake wiring harness 14 formed by binding the second wiring harness 42 connecting between the electric power storage device 31 and the electric power control device 32, and the third wiring harness 43 together into a single bundle, is laid to extend along the wheel arch portion 11a of the mud guard 11, so that it becomes possible to effectively suppress an increase in overall length of the regenerative brake wiring harness 14 and thus an increase in electrical resistance. Further, it becomes possible to adequately connect the electric power storage device 31 and the electric power control device 32 by the second wiring harness 42 without interference between the regenerative brake wiring harness 14 and the front wheel 12.

In the above embodiment, a second sound insulator 20 formed using an elastically-deformable material is provided between the front fender panel 9 and a hinge pillar 2 disposed in a rear end of the front fender panel 9 at a position on the vehicle inward side with respect to the front fender panel 9, to extend in the vehicle up-down direction, wherein a contact surface 20a of the second sound insulator 20 with the front fender panel 9 is formed as a smooth surface, and contact portions 20c, 20c of the second sound insulator 20 with the hinge pillar 2 are composed of a plurality of line-shaped protrusions each extending in the vehicle up-down direction (see FIGS. 7 and 8).

According to this feature, in addition to the above functions, it becomes possible to adequately set a contact pressure against the front fender panel 9 based on the contact portions 20c, 20c of the second sound insulator 20 having buckling strength, thereby enhancing sound insulation performance by the second sound insulator 20 while suppressing deformation of the front fender panel 9. Further, the second sound insulator 20 has the contact surface 20a extending in the vehicle up-down direction while being in surface contact with an inner surface of the front fender panel 9, so that it becomes possible to suppress the occurrence of rust in the front fender panel 9 which has a plate thickness less than that of the hinge pillar 2 and is thereby more likely to be influenced by rust.

Technical features of the above embodiment can be outlined as follows.

The above embodiment discloses a sound insulation structure for a vehicle, in which a sound insulator is provided in a void space surrounded by: a front fender panel; a cowl side member disposed on a vehicle inward side with respect to the front fender panel to extend in a vehicle front-rear direction; and a mud guard disposed just below the front fender panel and the cowl side member to form a wheel housing, wherein the sound insulator is formed using an elastically-deformable material, and formed with a slit capable of clamping an elongated line component laid to extend in the vehicle front-rear direction and pass through the void space. In this sound insulation structure, the slit is formed in the sound insulator, so that the elongated line component, such as a wiring harness, laid to extend in the vehicle front-rear direction can be clamped using the slit and adequately retained, while suppressing deterioration in sound insulation performance by the sound insulator. In short, it becomes possible to achieve both maintenance of sound insulation performance and retention of the line component.

The sound insulation structure disclosed in the above embodiment is further characterized in that it comprises a guiding cavity formed on the side of an inlet of the slit to have an inclined surface for guiding the elongated line component insertably toward the slit. According to this feature, the guiding cavity having the inclined surface functions as guide means to lead the elongated line component, such as a wiring harness, during insertion into the slit, so that it becomes possible to facilitate an operation of clampingly inserting the line component into the slit.

The sound insulation structure disclosed in the above embodiment is further characterized in that the guiding cavity is formed to be capable of housing an additional elongated line component laid to extend in the vehicle front-rear direction and pass through the void space. According to this feature, the guiding cavity can be effectively utilized as a space for housing an additional elongated line component different from the line component to be clamped by the slit.

The sound insulation structure disclosed in the above embodiment is further characterized in that the slit is formed to extend from a surface of the sound insulator on the side of the cowl side member toward the front fender panel, in a vehicle width direction. According to this feature, it becomes possible to form the depth to have a depth enough to clamp and retain the elongated line component such as a wiring harness, because the sound insulator can be formed to have a relatively large thickness in the vehicle width direction. Further, a fastener or a clip for retaining the elongated line component such as a wiring harness is attached to a lateral surface of the cowl side member. Thus, it becomes possible to facilitate laying of the line component.

The sound insulation structure disclosed in the above embodiment is further characterized in that the vehicle is equipped with an electric power storage device disposed frontward of a front wheel received in the wheel housing, an electric power control device disposed rearward of the front wheel, and a wiring harness connecting between the electric power storage device and the electric power control device, wherein the wiring harness is the line component clamped by the slit. According to this feature, in the sound insulation structure for the vehicle comprising the electric power storage device disposed frontward of the front wheel and thereby having an advantage of allowing the electric power storage device to be efficiently cooled by vehicle running wind, it becomes possible to adequately retain the wiring harness connecting between the electric power storage device and the electric power control device, within the void space above the front wheel in the front of the vehicle, while suppressing deterioration in sound insulation performance by the sound insulator. Further, the wiring harness connecting between the electric power storage device and the electric power control device has a relatively large diameter, so that an effective cross-sectional area of the sound insulation space is further reduced by the thick wiring harness passing through the void space, which provides an advantage of being able to enhance the sound insulation performance.

The sound insulation structure disclosed in the above embodiment is further characterized in that the wiring harness is laid to extend along a wheel arch portion of the mud guard. According to this feature, the wiring harness connecting between the electric power storage device and the electric power control device is laid to extend along the wheel arch portion of the mud guard, so that it becomes possible to effectively suppress an increase in overall length of the wiring harness and thus an increase in electrical resistance. Further, it becomes possible to adequately connect the electric power storage device and the electric power control device by the wiring harness without interference between the wiring harness and the front wheel.

In the above embodiment, the slit is formed to extend from the surface of the sound insulator 13 on the side of the cowl side member 5 toward the front fender panel 9, in the vehicle width direction. Alternatively, the slit may be reversely formed to extend from a surface of the sound insulator 13 on the side of the front fender panel 9 toward the cowl side member 5, in the vehicle width direction, or may be formed to extend from any surface of the sound insulator 13 in any direction. Further, instead of binding the second wiring harness 42 and the third wiring harness 43 together into a single bundle, only one of the second wiring harness 42 and the third wiring harness 43 may be clamped by the slit. Further, any elongated line component other than a wiring harness (e.g., a bonnet opener cable) may be clamped by the slit, and any elongated line component other than a cable (e.g., a wiring harness) may be housed in the guiding cavity.

While the present invention has been described appropriately and fully by way of the embodiment as above with reference to the drawings in order to express the present invention, it should be appreciated that anyone skilled in the art can readily change and/or modify the embodiment described above. It is therefore to be understood that a changed embodiment or a modified embodiment implemented by anyone skilled in the art is enclosed within the scope of the appended claims unless the changed embodiment or the modified embodiment is of a level that deviates from the scope of the appended claims.

INDUSTRIAL APPLICABILITY

The present invention can be industrially suitably used in the technical filed of a sound insulation structure for a vehicle, in which a sound insulator is provided in a void space surrounded by a front fender panel, a cowl side member and a mud guard disposed above a front wheel in a front of the vehicle.

What is claimed is:

1. A sound insulation structure for a vehicle, in which a sound insulator is provided in a void space surrounded by: a front fender panel; a cowl side member disposed on a vehicle inward side with respect to the front fender panel to extend in a vehicle front-rear direction; and a mud guard disposed just below the front fender panel and the cowl side member to form a wheel housing, wherein the sound insulator is formed using a single-piece elastically-deformable material, and fixed in the void space by means of its own compressive reaction force, the sound insulator comprising:

a vertical wall portion formed on a surface thereof on the side of the cowl side member, the vertical wall portion having a vehicle front-rear directional length which is set to a value less than a vehicle front-rear directional length of the sound insulator; and a slit formed in the vertical wall portion capable of clamping an elongated line component laid to extend in the vehicle front-rear direction and pass through the void space, and wherein the sound insulation structure comprises a guiding cavity for guiding the elongated line component insertably toward the slit, the guiding cavity being formed on the side of an inlet of the slit by a V-shaped inclined surface provided on the vertical wall portion, and wherein:

the guiding cavity is formed to be capable of housing an additional elongated line component laid to extend in the vehicle front-rear direction and pass through the void space; and the slit is formed to extend from the surface of the sound insulator on the side of the cowl side member toward the front fender panel, in a vehicle width direction.

2. The sound insulation structure as defined in claim 1, wherein the vehicle is equipped with an electric power storage device disposed frontward of a front wheel received in the wheel housing, an electric power control device disposed rearward of the front wheel, and a wiring harness connecting between the electric power storage device and the electric power control device, and wherein the wiring harness is the line component clamped by the slit.

3. The sound insulation structure as defined in claim 2, wherein the wiring harness is laid to extend along a wheel arch portion of the mud guard.

\* \* \* \* \*